(12) United States Patent
Eneim et al.

(10) Patent No.: US 11,914,749 B2
(45) Date of Patent: Feb. 27, 2024

(54) SELECTIVE AND PROTECTED RELEASE OF PRIVATE INFORMATION TO AN INCIDENT RESPONSE TEAM

(71) Applicant: MOTOROLA SOLUTIONS, INC., Chicago, IL (US)

(72) Inventors: Maryam Eneim, Boca Raton, FL (US); Kirk B Stuart, Pembroke Pines, FL (US); Graeme Johnson, Plantation, FL (US); Emily Namm, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 335 days.

(21) Appl. No.: 17/457,956

(22) Filed: Dec. 7, 2021

(65) Prior Publication Data
US 2023/0177204 A1 Jun. 8, 2023

(51) Int. Cl.
*G06F 21/62* (2013.01)
*G06F 9/54* (2006.01)
*G06F 16/22* (2019.01)
*G06Q 50/26* (2012.01)
*G06V 40/16* (2022.01)
*G08B 21/10* (2006.01)

(52) U.S. Cl.
CPC .......... *G06F 21/6245* (2013.01); *G06F 9/541* (2013.01); *G06F 16/22* (2019.01); *G06Q 50/265* (2013.01); *G06V 40/172* (2022.01); *G06V 40/179* (2022.01); *G08B 21/10* (2013.01); *G06F 2221/2113* (2013.01)

(58) Field of Classification Search
CPC .. G06F 21/6245; G06Q 50/265; G06V 20/52; G06V 40/172; G06V 40/179; G08B 21/10
See application file for complete search history.

(56) References Cited

U.S. PATENT DOCUMENTS

| | | | |
|---|---|---|---|
| 10,255,453 B2 | 4/2019 | Calo et al. | |
| 10,858,808 B2 | 12/2020 | Okada et al. | |
| 2012/0143657 A1* | 6/2012 | Silberberg | G06Q 30/0207 705/14.1 |
| 2015/0242638 A1 | 8/2015 | Bitran et al. | |
| 2017/0124834 A1 | 5/2017 | Pedersoli et al. | |
| 2018/0365785 A1* | 12/2018 | Boss | H04L 67/306 |
| 2020/0043174 A1* | 2/2020 | Togashi | G06V 40/173 |
| 2020/0233680 A1* | 7/2020 | Ma | G06F 16/252 |
| 2021/0076454 A1* | 3/2021 | Palanivel | H04W 76/50 |

OTHER PUBLICATIONS

Eneim, Maryam et al.: "Data Privacy Management Based on Conditional Thresholds", U.S. Appl. No. 17/449,831, filed Oct. 4, 2021, all pages.

* cited by examiner

*Primary Examiner* — Gil H. Lee
(74) *Attorney, Agent, or Firm* — Daniel R. Bestor (57) ABSTRACT

Selective and protected release of private information/data to an incident response team (for example, public safety personnel) is disclosed. The private data (which pertains to individuals recorded as being within a premises at the time of an incident with respect to which the incident response team is responding to) may take the form of a system-generated log, which may be transferred to a first level of the public safety personnel once authenticated. Based on at least one of role, incident type, and incident severity, the first level of authenticated public safety personnel may release at least a portion of the private data to a second level of authenticated public safety personnel.

19 Claims, 4 Drawing Sheets

- 410 — IN RESPONSE TO AN ALERT TRIGGER GENERATED BY AN ALARM SYSTEM AND INDICATIVE OF AN INCIDENT AT A PREMISES COMPUTING A LAST KNOWN NUMBER OF INDIVIDUALS RECORDED AS BEING WITHIN THE PREMISES

- 420 — APPLYING VIDEO ANALYTICS ON STORED RECORDED VIDEO, PREVIOUSLY CAPTURED BY SECURITY CAMERAS WITHIN THE PREMISES, TO : I) PERFORM FACIAL RECOGNITION ON FACES OF PEOPLE APPEARING IN THE STORED RECORDED VIDEO FOR IDENTIFICATION, AND II) OBTAIN LAST KNOWN LOCATIONS FOR PEOPLE WITHIN THE PREMISES AT A TIME OF THE INCIDENT BASED ON VIDEO TRACKING DATA

- 430 — CROSS-VALIDATING RESULTS OF THE APPLIED VIDEO ANALYTICS BY USING ACCESS CONTROL LOGS AND LPR PARKING LOGS STORED IN AN OFF-PREMISES DATABASE TO : I) CONFIRM A PLURALITY OF FIRST INDIVIDUALS, AND II) PRELIMINARILY DETERMINE ONE OR MORE SECOND INDIVIDUALS WHOSE FACIAL CHARACTERISTICS WERE NOT CAPTURED BASED ON THE ACCESS CONTROL LOGS AND THE LPR PARKING LOGS

- 440 — GENERATING A LOG OF PRIVATE DATA PERTAINING TO THE FIRST AND SECOND INDIVIDUALS

- 450 — AUTHENTICATING A FIRST LEVEL OF PUBLIC SAFETY PERSONNEL

- 460 — TRANSFERRING THE LOG OF THE PRIVATE DATA TO THE AUTHENTICATED FIRST LEVEL OF PUBLIC SAFETY PERSONNEL

SELECTIVE AND PROTECTED RELEASE OF PRIVATE INFORMATION TO AN INCIDENT RESPONSE TEAM

BACKGROUND

When a disaster or a public safety incident occurs in a premises (which may include, for instance, one or more buildings and surrounding commonly owned land), public safety personnel potentially have to search the entire premises in connection with their rescue efforts, de-escalate a dangerous situation, etc. The search for individuals can be complicated when there is uncertainty as to who may be actually present (and how many people are present for that matter) within the premises. In addition, having the information of people's pictures, names and/or whereabouts may, in various jurisdictions, create issues around potential privacy violations should, for example, anyone at any moment be identifiable with their respective location tagged. In some jurisdictions, this type of information is referred to as Protected Personal Information (PPI).

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

According to one example embodiment, there is provided a computer-implemented method carried out in an off-premises server that is connected to an off-premises database and is also communicatively coupled to an alarm system within a premises. The computer-implemented method includes, in response to an alert trigger generated by the alarm system and indicative of an incident, computing a last known number of individuals recorded as being within the premises. The computer-implemented method also includes applying video analytics on stored recorded video, previously captured by security cameras within the premises, to: i) perform facial recognition on faces of people appearing in the stored recorded video for identification, and ii) obtain last known locations for the people within the premises at a time of the incident based on video tracking data stored in the off-premises database. The computer-implemented method also includes cross-validating results of the applied video analytics by using access control logs and LPR parking logs stored in the off-premises database to: i) confirm a determination of a plurality of first individuals, and ii) preliminarily determine one or more second individuals whose facial characteristics were not captured based on the access control logs and the LPR parking logs. The computer-implemented method also includes generating a log of private data pertaining to the first and second individuals. The computer-implemented method also includes authenticating a first level of public safety personnel. The computer-implemented method also includes transferring the log of the private data to the authenticated first level of public safety personnel.

According to another example embodiment, there is provided an apparatus that includes a plurality of sensor systems as part of a premises. The sensor systems include a plurality of security cameras, a physical access control system, and one or more vehicle License Plate Recognition (LPR) cameras. The apparatus also includes an alarm system and an off-premises database for storing output of the sensor systems. The output includes video tracking data, access control logs, and License Plate Recognition (LPR) parking logs. An off-premises server is connected to the off-premises database. The off-premises server includes at least one processor configured to, in response to an alert trigger generated by the alarm system and indicative of an incident, compute a last known number of individuals recorded as being within the premises. The at least one processor is also configured to apply video analytics on stored recorded video, previously captured by the security cameras, to: i) perform facial recognition on faces of people appearing in the stored recorded video for identification, and ii) obtain last known locations for the people within the premises at a time of the incident based on the video tracking data. The at least one processor is also configured to cross-validate results of the applied video analytics by using the access control logs and the LPR parking logs stored in the off-premises database to: i) confirm a determination of a plurality of first individuals, and ii) preliminarily determine one or more second individuals whose facial characteristics were not captured based on the access control logs and the LPR parking logs. The at least one processor is also configured to generate a log of private data pertaining to the first and second individuals. The at least one processor is also configured to authenticate a first level of public safety personnel. The at least one processor is also configured to transfer the log of the private data to the authenticated first level of public safety personnel.

Each of the above-mentioned embodiments will be discussed in more detail below, starting with example system and device architectures of the system in which the embodiments may be practiced, followed by an illustration of processing blocks for achieving an improved technical method, system and computer program product for secure communication between different agencies in an incident area. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Figure 1:
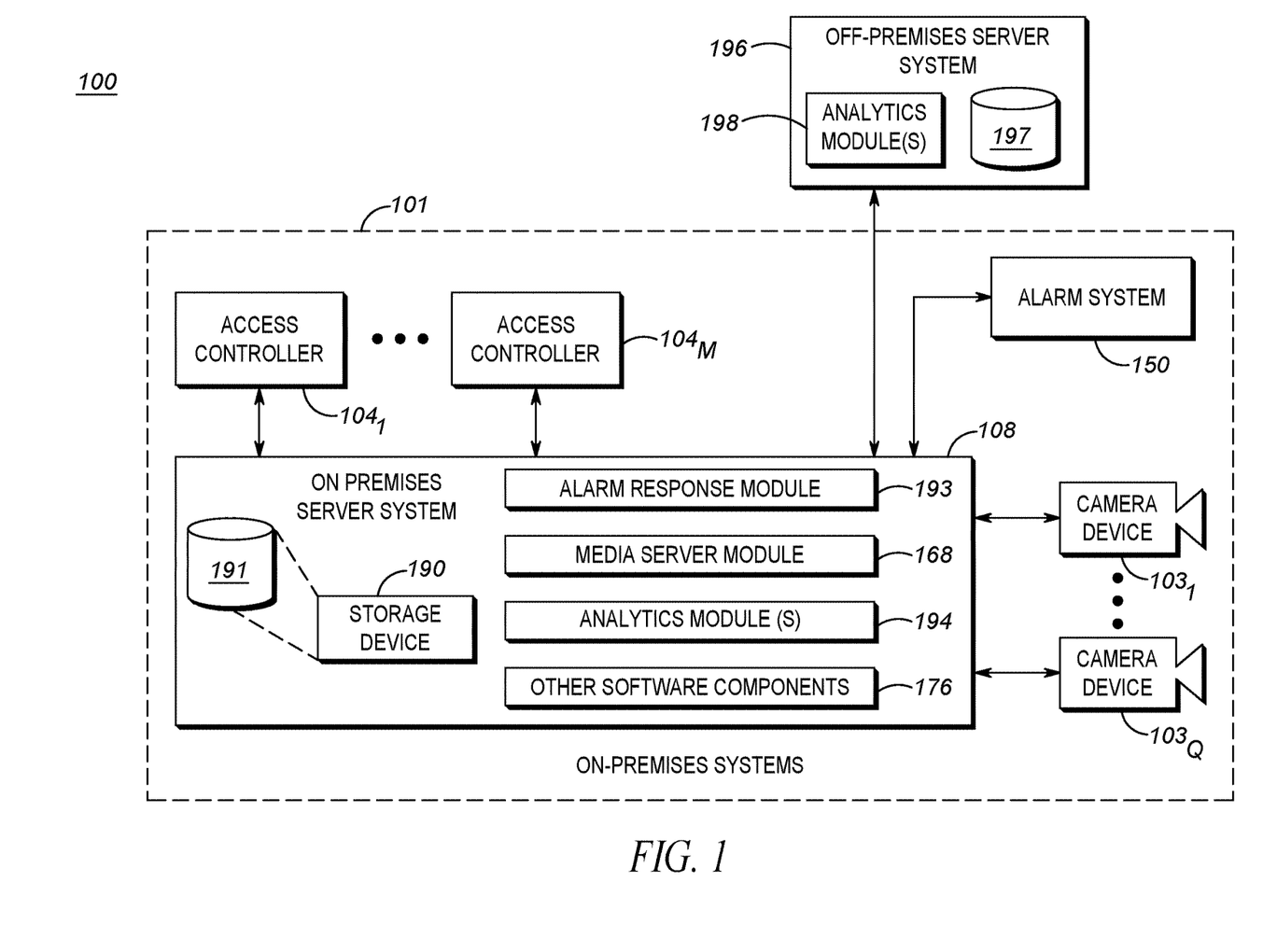
FIG. 1 is a block diagram of geographically distributed systems within which methods in accordance with example embodiments can be carried out.

Referring now to the drawings, and in particular FIG. 1 which is a block diagram of geographically distributed systems 100 within which methods in accordance with example embodiments can be carried out. Included within the illustrated geographically distributed systems 100 are: "ON-PREMISES SYSTEMS" 101 (which may be operated by one entity such as, for example, a property management entity, a corporation, a private security agency, etcetera).

Regarding the on-premises systems 101, this includes a plurality of camera devices $103_1$-$103_Q$ (hereinafter interchangeably referred to as "cameras $103_1$-$103_Q$" when referring to all of the illustrated cameras, or "camera 103" when referring to any individual one of the plurality) where Q is any suitable integer greater than one. The on-premises systems 101 also includes a plurality of access controllers $104_1$-$104_M$ (hereinafter interchangeably referred to as "access controllers $104_1$-$104_M$" when referring to all of the illustrated access controllers, or "access controller 104" when referring to any individual one of the plurality) where M is any suitable integer greater than one (although a single access controller 104 instead of a plurality of access controllers is also contemplated). The on-premises systems 101 also includes an on-premises server system 108.

In some example embodiments, the on-premises server system 108 may comprise a single physical machine or multiple physical machines. It will be understood that the on-premises server system 108 need not be contained within a single chassis, nor necessarily will there be a single location for the on-premises server system 108.

The access controller 104 communicates with the on-premises server system 108 through one or more networks. These networks can include the Internet, or one or more other public/private networks coupled together by network switches or other communication elements. The network(s) could be of the form of, for example, client-server networks, peer-to-peer networks, etc. Data connections between the access controller 104 and the on-premises server system 108 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the access controller 104 and the on-premises server system 108 are within the same local area network (LAN). In some examples, the access controller 104 communicates directly or indirectly with other parts of on-premises systems 101 besides the on-premises server system 108. For instance, it is contemplated that the access controller 104 may communicate directly or indirectly with one or more of the cameras $103_1$-$103_Q$.

Figure 2:
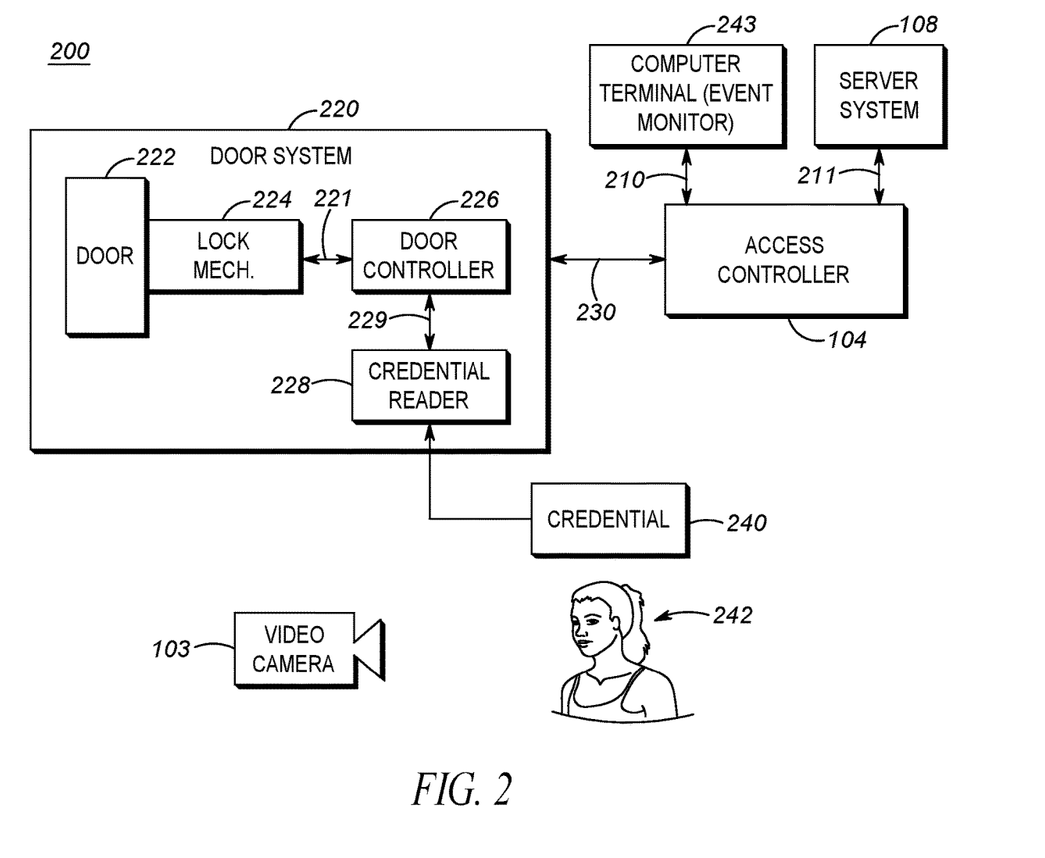
FIG. 2 is a block diagram a physical access control system that may include one or more of the access controllers shown in FIG. 1.

The access controller 104 may be incorporated into a physical access control system 200 as shown in FIG. 2. Also as shown in FIG. 2, a door system 220 is shown in communication with the access controller 104 over the communication path 230. The door system 220 includes the access door 222, door locking mechanism 224, door controller 226, and credential reader 228. The door 222 may be any door that allows individuals to enter or leave an associated enclosed area. The door 222 may include a position sensor (for example, a limit switch) that indicates when the door 222 is not fully closed. The position sensor may send a not-fully-closed signal over the signal path 221 to the door controller 226.

With respect to the illustrated door system 220, the locking mechanism 224 includes a remotely operated electro-mechanical locking element (not shown) such as a dead bolt that is positioned (locked or unlocked) in response to an electrical signal sent over the signal path 221 from the door controller 226.

The door controller 226 receives credential information over the signal path 229 from the credential reader 228 and passes the information to the access controller 104 over another signal path 230. The door controller 226 receives lock/unlock signals from the access controller 104 over the signal path 230. The door controller 226 sends lock mechanism lock/unlock signals over the signal path 221 to the locking mechanism 224.

The credential reader 228 receives credential information 240 for an identifiable individual 242. The credential information 240 may be encoded in an RFID chip, a credential on a smart card, a PIN/password input using a key pad, and biometric data such as fingerprint and retina scan data, for example.

The door system 220 operates based on access request signals sent to the access controller 104 and access authorization signals received, in response, from the access controller 104. The door system 220 may incorporate an auto lock feature that activates (locks) the door 222 within a specified time after the door 222 is opened and then shut, after an unlock signal has been sent to the locking mechanism 224 but the door 222 not opened within a specified time, or under other conditions. The auto lock logic may be implemented in the door controller 226 or the locking mechanism 224.

The door system 220 may send event signals 210 to a computer terminal 243 by way of the access controller 104. Such signals include door open, door closed, locking mechanism locked, and locking mechanism unlocked. As noted above, the signals may originate from limit switches in the door system 220. Data signals 211 between the access controller 104 and the server system 108 includes access control-related data (such as, for example, data related to access control-related events, access control directory data, etcetera).

In one example embodiment, the door system 220 may be used for both entry and egress. In an alternative example embodiment, the door system 220 may be used only for entry and a separate door system 220 may be used only for egress.

However configured, the door systems 220 may trigger the event that indicates when the identifiable individual 242 has entered into a particular area and when the identifiable individual 242 has exited from that particular area, based on information obtained by reading credential information 240 of the identifiable individual 242 on entry and exit, respectively. These signals may be used to prevent reentry without an intervening exit, for example. The presence or absence of these signals also may be used to prevent access to areas and systems within the enclosed area. For example, the identifiable individual 242 may not be allowed to log into a computing resource or smart device in the area in the absence of an entry signal originating from one of the door systems 220 of the respective area. Thus, the access controller 104 and its implemented security functions may be a first step in a cascading series of access operations to which an individual may be exposed.

The door systems 220 may incorporate various alerts, such as for a propped open door 222, a stuck unlocked locking mechanism 224, and other indications of breach or fault. Also, in some examples, at least one video camera (for example, the camera 103 as illustrated) may be placed in relative close proximity to the door 222 such that a Field Of View (FOV) of the camera 103 captures images of the door 222 and an area around the door 222. In this manner, the system will capture video footage of the identifiable individual 242 which should show that person passing through (or attempting to pass through) the door 222 being monitored by video surveillance.

Referring once again to FIG. 1, the on-premises server system 108 includes several software components for carrying out other functions of the on-premises server system 108. For example, the on-premises server system 108 includes a media server module 168. The media server module 168 handles client requests related to storage and retrieval of security video taken by camera devices $103_1$-$103_q$ included within the on-premises systems 101. The on-premises server system 108 also includes server-side analytics module(s) 194 which can include, in some examples, any suitable one of known commercially available software that carry out computer vision related functions (complementary to any video analytics performed in the cameras) as understood by a person of skill in the art. The server-side analytics module(s) 194 can also include software for carrying out non-video analytics, such as audio analytics that may, for example, convert spoken words into text, carry out audio emotion recognition, etc.

The on-premises server system 108 also includes a number of other software components 176. These other software components will vary depending on the requirements of the on-premises server system 108 within the overall system. As just one example, the other software components 176 might include special test and debugging software, or software to facilitate version updating of modules within the on-premises server system 108.

Regarding the at least one storage device 190, this comprises, for example, one or more databases 191 which may facilitate the organized storing of recorded security video, non-video sensor data, access control-related data, etcetera in accordance with example embodiments. The one or more databases 191 may also contain metadata related to, for example, the recorded security video that is storable within one or more storages. The one or more databases 191 may also contain other types of metadata besides video metadata. Examples of metadata other than video metadata, that may be stored in the one or more databases 191, include audio metadata, Global Positioning System (GPS) location metadata, etcetera. Regarding the types of access control-related data that may be stored in one or more databases 191, this was previously described in connection with FIG. 2. Finally, it should also be noted that any PPI stored in the one or more databases 191 is kept encrypted or otherwise protected so that it can only be accessed under authorized circumstances.

The illustrated on-premises server system 108 is also in communication with an off-premises server 196 (at a location remote from the premises) over a wide area network (WAN). Various examples of suitable known WANs have already herein been mentioned. Information and data received from the on-premises server system 108 can be stored in one or more databases 197 within the off-premises server 196. Examples of possible information and data stored in the one or more databases 197 video footage, images, video/image metadata, video tracking data, access control logs, and License Plate Recognition (LPR) parking logs. One or more analytics module(s) 198 carry out analytics functions in connection with an incident response (for example, facial recognition on images and/or video stored in the one or more databases 197). Also, any PPI stored in the one or more databases 197 is kept encrypted or otherwise protected so that it can only be accessed under authorized circumstances.

Still with reference to FIG. 1, the camera 103 is operable to capture a plurality of images and produce image data representing the plurality of captured images. The camera 103, an image capturing device, may include, for example, a security video camera, a mobile video camera wearable by a person (for instance, a security guard, a concierge, etcetera), or some other type of fixed or mobile camera. Furthermore, it will be understood that the on-premises systems 101 includes any suitable number of cameras (i.e. Q is any suitable integer greater than zero). In some examples, the cameras $103_1$-$103_Q$ include the following: i) at least one facial recognition camera (for example, each aimed at an exterior door of a building on the premises); and ii) at least one ALPR camera (for example, each aimed at an entry/exit gate to a parking lot, parking garage or other premises-related area where vehicles traverse/park). In some examples, at least some of the cameras $103_1$-$103_Q$ work together in concert to track movement and floor locations of people within the premises (the tracked movement of people is collected and stored as video tracking data, which is discussed further in other parts of this patent document).

Figure 3:
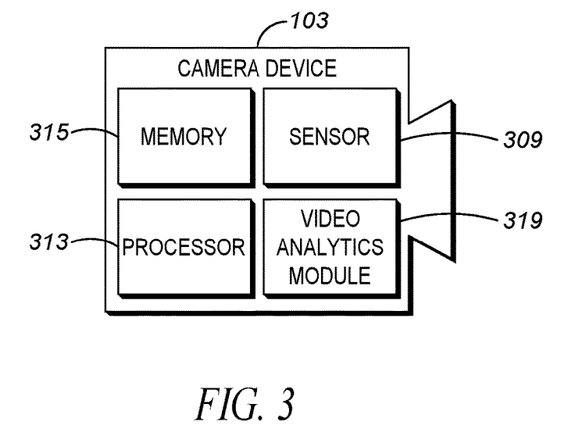
FIG. 3 is a block diagram showing more detail of one of the cameras shown in FIG. 1.

More details of the camera 103 are shown in FIG. 3. The camera 103 includes an image sensor 309 for capturing a plurality of images. The camera 103 may be a digital video camera and the image sensor 309 may output captured light as a digital data. For example, the image sensor 309 may be a CMOS, NMOS, or Charge-Couple Device (CCD). In some embodiments, the camera 103 may be an analog camera connected to an encoder. The illustrated camera 103 may be a 2D camera; however use of a structured light 3D camera, a time-of-flight 3D camera, a 3D Light Detection and Ranging (LiDAR) device, a stereo camera, or any other suitable type of camera within the on-premises systems 101 is contemplated. In some example embodiments, the camera 103 may be a fixed video camera installed at a specific location in the premises being protected by the on-premises systems 101.

The image sensor 309 may be operable to capture light in one or more frequency ranges. For example, the image sensor 309 may be operable to capture light in a range that substantially corresponds to the visible light frequency range. In other examples, the image sensor 309 may be operable to capture light outside the visible light range, such as in the infrared and/or ultraviolet range. In other examples, the camera 103 may have characteristics such that it may be described as being a "multi-sensor" type of camera, such that the camera 103 includes pairs of two or more sensors that are operable to capture light in different and/or same frequency ranges.

The camera 103 may be a dedicated camera. It will be understood that a dedicated camera herein refers to a camera whose principal features is to capture images or video. In some example embodiments, the dedicated camera may perform functions associated with the captured images or video, such as but not limited to processing the image data produced by it or by another camera. For example, the dedicated camera may be a security camera, such as any one of a pan-tilt-zoom camera, dome camera, in-ceiling camera, box camera, and bullet camera.

Additionally, or alternatively, the camera 103 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, physical access control device, video game console or controller.

The camera 103 includes one or more processors 313, one or more video analytics modules 319, and one or more memory devices 315 coupled to the processors and one or more network interfaces. Regarding the video analytics module 319, this generates metadata transmitted from an output of the camera 103 to the on-premises server system 108. The metadata can include, for example, records which describe various detections of persons (or vehicles, or other objects) such as, for instance, pixel locations for the detected object in respect of a first record and a last record for the camera within which the respective metadata is being generated.

Regarding the memory device 315 within the camera 103, this can include a local memory (such as, for example, a random access memory and a cache memory) employed during execution of program instructions. Regarding the processor 313, this executes computer program instructions (such as, for example, an operating system and/or software programs), which can be stored in the memory device 315.

In various embodiments the processor 313 may be implemented by any suitable processing circuit having one or more circuit units, including a digital signal processor (DSP), graphics processing unit (GPU) embedded processor, a visual processing unit or a vison processing unit (both referred to herein as "VPU"), etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example. A system on a chip (SOC) implementation is also common, where a plurality of the components of the camera 103, including the processor 313, may be combined together on one semiconductor chip. For example, the processor 313, the memory device 315 and the network interface of the camera 103 may be implemented within a SOC. Furthermore, when implemented in this way, a general purpose processor and one or more of a GPU or VPU, and a DSP may be implemented together within the SOC.

In various example embodiments, the memory device 315 coupled to the processor 313 is operable to store data and computer program instructions. The memory device 315 may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etcetera, or any combination thereof, for example. The memory device 315 may be operable to store in memory (including store in volatile memory, non-volatile memory, dynamic memory, etcetera, or any combination thereof).

As shown in FIG. 1, the camera 103 is coupled to the on-premises server system 108. In some examples, the camera 103 is coupled to the on-premises server system 108 via one or more suitable networks. These networks can include the Internet, or one or more other public/private networks coupled together by network switches or other communication elements. The network(s) could be of the form of, for example, client-server networks, peer-to-peer networks, etc. Data connections between the camera 103 and the on-premises server system 108 can be any number of known arrangements, examples of which were previously herein detailed. In at least one example embodiment, the camera 103 and the on-premises server system 108 are within the same LAN. In some examples, the camera 103 may be coupled to the on-premises server system 108 in a more direct manner than as described above.

The on-premises systems 101 also includes an alarm system 150. (Although just one alarm system 150 is shown in FIG. 1 for convenience of illustration, it will be understood that any suitable number of alarm systems are contemplated.) The alarm system 150 is coupled to the on-premises server system 108, which in turn includes an alarm response module 193 for receiving and processing alarms. In some examples, the alarm system 150 is coupled to the on-premises server system 108 via one or more suitable networks. These networks can include the Internet, or one or more other public/private networks coupled together by network switches or other communication elements. The network(s) could be of the form of, for example, client-server networks, peer-to-peer networks, etc. Data connections between the alarm system 150 and the on-premises server system 108 can be any number of known arrangements, examples of which were previously herein detailed. In at least one example embodiment, the alarm system 150 and the on-premises server system 108 are within the same LAN. In some examples, the alarm system 150 may be coupled to the on-premises server system 108 in a more direct manner than as described above.

Figure 4:
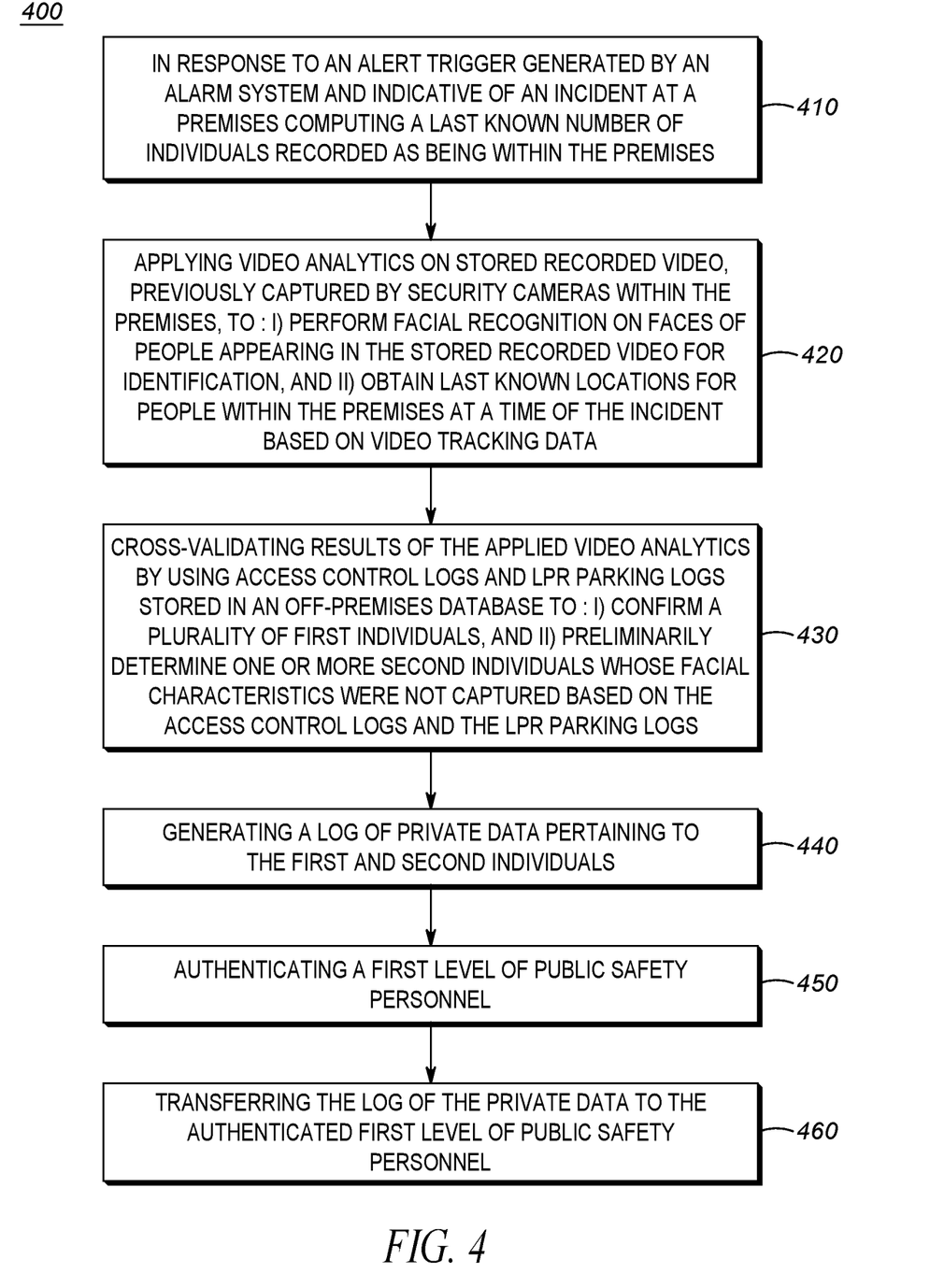
FIG. 4 is a flow chart illustrating a computer-implemented method in accordance with an example embodiment.
Figure 5:
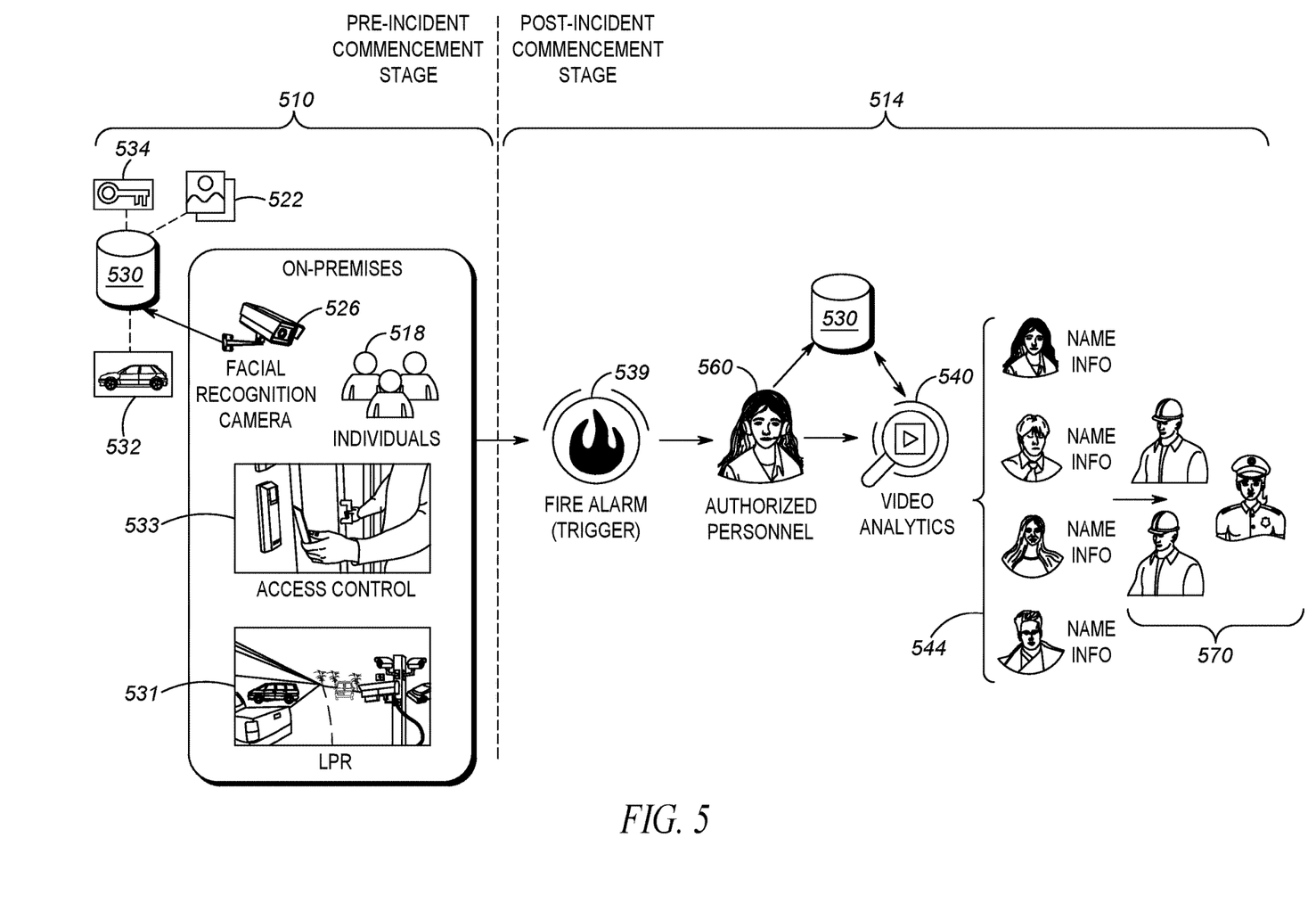
FIG. 5 is a block diagram showing collection and transfer of PPI in accordance with an example embodiment.

In some examples, the alarm system 150 is a fire alarm system, a spectrometer-based alarm system, a gunshot detection system, or other type of alarm system that may initiate a public safety personnel response. In accordance with at least one example embodiment, the alarm system 150 generates an alert trigger when an alarm condition is met, and this alert trigger (indicative of an incident) is transmitted to the on-premises server system 108. In response to this alert trigger generated by the alarm system 150, the on-premises server system 108 may be configured to compute a last known number of individuals recorded as being within the premises Reference is now made to FIGS. 4 and 5. FIG. 4 is a flow chart illustrating a computer-implemented method 400 in accordance with an example embodiment. FIG. 4 is described below with reference to FIG. 5, which is a block diagram showing collection and transfer of PPI in accordance with an example embodiment. FIG. 5 is divided into a pre-incident commencement stage 510 and a post-incident commencement stage 514. During the pre-incident commencement stage 510, various individuals 518 enter the premises with a subset of the individuals 518 leaving the premises prior to the incident. Respective facial images 522 of the individuals 518 are captured by at least one facial recognition camera 526, and stored in at least one database 530 until they are detected as having exited the premises (i.e. there is deletion of those facial images 522 of the subset of the individuals 518 who leave the premises prior to the incident). Also, it will be understood that the at least one facial recognition camera 526 and the at least one database 530 may be similar or the same as the camera 103 and the one or more databases 197 respectively (FIG. 1).

Also during the pre-incident commencement stage 510, LPR (denoted by reference numeral 531) is carried out on images of a plurality of vehicle license plates (i.e. in a manner and to an extent as previously herein described). LPR parking logs 532 corresponding to the carrying out of the LPR are stored in the at least one database 530.

Also during the pre-incident commencement stage 510, access control transactions and events (denoted by reference numeral 533) occur within the premises (i.e. in a manner and to an extent as previously herein described). Associated access control logs 534 are generated (for example, by one or more of the access controllers $104_1$-$104_M$) and stored in the at least one database 530.

With continuing reference to FIGS. 4 and 5, the illustrated method 400 of FIG. 4 includes computing (410) a last known number of individuals recorded as being within the premises (this is carried out in response to an alert trigger generated by an alarm system, where the generated alert trigger is indicative of a detected incident at a premises). The alert trigger from the alarm system of the illustrated action 410 may be, for example, a trigger 539 (FIG. 5) from the alarm system 150 (FIG. 1).

Next the illustrated method 400 of FIG. 4 includes applying video analytics (420) on stored recorded video, previously captured by security cameras within the premises (also illustratively represented in FIG. 5 as video analytics 540). The applying of the video analytics 540 may include the following: i) performing facial recognition on faces of people appearing in the stored recorded video for identification; and ii) obtaining last known locations for the people within the premises at a time of the incident based on video tracking data.

Next the illustrated method 400 of FIG. 4 includes cross-validating results of the applied video analytics (430) by using access control logs and LPR parking logs stored in an off-premises database to: i) confirm a plurality of first individuals (i.e. matches from the cross-validating); and ii) preliminarily determine one or more second individuals whose facial characteristics were not captured based on the access control logs and the LPR parking logs. The access control logs may have originated from, for example, the physical access control system 200 (FIG. 2) previously herein described.

Next the illustrated method 400 of FIG. 4 includes generating (440) a log of private data pertaining to the first and second individuals (for example, diagrammatic representation 544 of a log shown in FIG. 5).

Next the illustrated method 400 of FIG. 4 includes authenticating (450) a first level of public safety personnel (for example, diagrammatic representation 560 of such first level personnel shown in FIG. 5).

Finally, the illustrated method 400 of FIG. 4 includes transferring the log of the private data (460) to the authenticated first level of public safety personnel. In some examples, the log being provided is just one part of other information that may be concurrently obtained (for example, in a hostage or shooter situation where a potential suspect is determined, additional PPI in relation to the mental history of the potential suspect may be securely obtained from one or more different sources). The log of private data 544 may include, for example, headcount information relevant to the incident, and face images (along with corresponding names, where available, or an unknown person flag, where not available).

In some examples where there is video-based person tracking (or other form of person tracking) within the premises, it is contemplated that the log of private data 544 may facilitate or provide more granular headcount reporting than merely some total for the entire premises. Depending on the nature and type of the incident being responded to, this may facilitate prioritizing response efforts. Table 1 below shows an example of information reported in a way that might prioritizing response efforts in the case of a fire alarm (it should be noted that the numbers and other details below are for illustrative purposes only, and not in any way be considered limiting).

TABLE 1

Headcount Report

| Floor(s) | "Above", "Below" or "At" Floor of Where Alarm Generated | Headcount |
| --- | --- | --- |
| 7-10 | Above | 25 |
| 6 | At | 7 |
| 1-5 | Below | 36 |

So for response efforts, the example report of Table 1 might be used as follows: first prioritize rescuing and/or assisting the seven people of Floor 6, next prioritize rescuing and/or assisting the twenty five people on Floors 7-10, etcetera.

Continuing on, in addition to first level of public safety personnel, it is contemplated that there may be one or more additional levels of public safety personnel (for example, the illustrated example embodiment of FIG. 5 depicts second level public safety personnel 570). In at least one example embodiment, the first level of authenticated public safety personnel releases at least a portion of the private data to a second level of authenticated public safety personnel (or alternatively releases it to second to $n^{th}$ levels, where n is an integer greater than two) based on at least one of role, incident type, and incident severity. In some examples, the identities of individuals determined to be located within the premises may be released to all of the second level of authenticated public safety personnel. In other examples, such identities may not be released to the second level of authenticated public safety personnel (or only some, but not all, of such public safety personnel).

In some examples, the off-premises server 196 may send a temporary link (to members of a defined contact list) that provides access to the log of the private data. This link may be a Uniform Resource Locator (URL) or alternatively some other type of link (e.g. not URL-based) that would be suitable for the contemplated type of data transfer. As will be understood by those skilled in the art, a temporary link is one that will expire after a period of time (i.e. the link cannot thereafter be used to access the resource). In the case of a temporary URL, this may include, for instance, a sequence of randomly generated letters, numbers and/or permitted symbols.

Furthermore, a contact list may be defined that includes, in respect of public safety employees, at least one of emails, phone numbers, twitter handles, and instant messaging account information. For at least some of those on the contact list, the above-described link may be sent to them so that they may access at least a portion of the log of the private data.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etcetera, and cannot apply video analytics on stored recorded video, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a LAN or a WAN, or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. Apparatus comprising:
   a plurality of sensor systems as part of a premises, and including a plurality of security cameras, a physical access control system, and one or more vehicle License Plate Recognition (LPR) cameras;
   an alarm system;
   an off-premises database for storing output of the sensor systems, the output including video tracking data, access control logs, and License Plate Recognition (LPR) parking logs; and
   an off-premises server connected to the off-premises database, the off-premises server having at least one processor configured to:
   in response to an alert trigger generated by the alarm system and indicative of an incident, compute a last known number of individuals recorded as being within the premises;
   apply video analytics on stored recorded video, previously captured by the security cameras, to:
   perform facial recognition on faces of people appearing in the stored recorded video for identification, and
   obtain last known locations for the people within the premises at a time of the incident based on the video tracking data;
   cross-validate results of the applied video analytics by using the access control logs and the LPR parking logs stored in the off-premises database to:
   confirm a determination of a plurality of first individuals, and
   preliminarily determine one or more second individuals whose facial characteristics were not captured based on the access control logs and the LPR parking logs;
   generate a log of private data pertaining to the first and second individuals;
   authenticate a first level of public safety personnel; and
   transfer the log of the private data to the authenticated first level of public safety personnel.

2. The apparatus as claimed in claim 1 wherein at least a portion of the private data is releasable by the first level of authenticated public safety personnel to a second level of authenticated public safety personnel based on at least one of role, incident type, and incident severity.

3. The apparatus of claim 1 wherein:
   the off-premises server is configured to receive a defined contact list of public safety employees,
   the defined contact list includes at least one of emails, phone numbers, twitter handles, and instant messaging account information, and
   the at least one processor is further configured to send a temporary link, to members of the defined contact list, that provides access to the log of the private data.

4. The apparatus of claim 3 wherein the temporary link points to content that includes face images and headcount information relevant to the incident.

5. The apparatus of claim 4 wherein the headcount information is provided in a report breaking down the headcount information, by response prioritization, into a plurality of identifiable locations within the premises.

6. The apparatus of claim 5 wherein the identifiable locations are floors or groupings of floors in a building on the premises.

7. The apparatus of claim 1 wherein the off-premises server is configured to communicate, during a time period of the transfer of the log of the private data by the at least one processor, with a dedicated mobile or desktop application that authenticates users upon login.

8. The apparatus of claim 1 wherein the at least one processor is further configured to operatively link with an Application Programming Interface (API) that permits a public safety communication system to initiate an uploading transfer of the log of the private data to authenticated first level of public safety personnel.

9. The apparatus of claim 1 wherein the at least one processor is further configured to:
 obtain phone numbers, email addresses, or a combination thereof for at least some of the first and second individuals, and
 transmit notifications to respective at least some of the first and second individuals indicating a determination of presence in the premises during the incident.

10. The apparatus of claim 9 wherein the at least one processor is further configured to receive a number of responses to the notifications, the responses providing information about respective one or people needing or not needing rescue assistance.

11. A computer-implemented method carried out in an off-premises server that is connected to an off-premises database and is also communicatively coupled to an alarm system within a premises, the computer-implemented method comprising:
 in response to an alert trigger generated by the alarm system and indicative of an incident, computing a last known number of individuals recorded as being within the premises;
 applying video analytics on stored recorded video, previously captured by security cameras within the premises, to:
  perform facial recognition on faces of people appearing in the stored recorded video for identification, and
  obtain last known locations for the people within the premises at a time of the incident based on video tracking data stored in the off-premises database;
 cross-validating results of the applied video analytics by using access control logs and LPR parking logs stored in the off-premises database to:
  confirm a determination of a plurality of first individuals, and
  preliminarily determine one or more second individuals whose facial characteristics were not captured based on the access control logs and the LPR parking logs;
 generating a log of private data pertaining to the first and second individuals;
 authenticating a first level of public safety personnel; and
 transferring the log of the private data to the authenticated first level of public safety personnel.

12. The computer-implemented method of claim 11 wherein the first level of authenticated public safety personnel releases at least a portion of the private data to a second level of authenticated public safety personnel based on at least one of role, incident type, and incident severity.

13. The computer-implemented method of claim 11 further comprising:
 receiving a defined contact list of public safety employees at the off-premises server, the defined contact list including at least one of emails, phone numbers, twitter handles, and instant messaging account information; and
 sending a temporary link, to members of the defined contact list, that provides access to the log of the private data.

14. The computer-implemented method of claim 13 wherein the temporary link points to content that includes face images and headcount information relevant to the incident.

15. The computer-implemented method of claim 14 wherein the headcount information is provided in a report breaking down the headcount information, by response prioritization, into a plurality of identifiable locations within the premises.

16. The computer-implemented method of claim 15 wherein the identifiable locations are floors or groupings of floors in a building on the premises.

17. The computer-implemented method of claim 11 wherein the off-premises server communicates, during a time period of the transfer of the log of the private data, with a dedicated mobile or desktop application that authenticates users upon login.

18. The computer-implemented method of claim 11 further comprising:
 obtaining phone numbers, email addresses, or a combination thereof for at least some of the first and second individuals; and
 transmitting notifications to respective at least some of the first and second individuals indicating a determination of presence in the premises during the incident.

19. The computer-implemented method of claim 18 further comprising receiving a number of responses to the notifications, the responses providing information about respective one or people needing or not needing rescue assistance.

* * * * *